(12) United States Patent
Hashimoto

(10) Patent No.: US 12,187,126 B2
(45) Date of Patent: Jan. 7, 2025

(54) DISPLAY CONTROL DEVICE AND DISPLAY CONTROL METHOD

(71) Applicant: Mitsubishi Electric Corporation, Tokyo (JP)

(72) Inventor: Takayasu Hashimoto, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 31 days.

(21) Appl. No.: 18/071,641

(22) Filed: Nov. 30, 2022

(65) Prior Publication Data

US 2023/0089233 A1    Mar. 23, 2023

Related U.S. Application Data

(63) Continuation of application No. PCT/JP2020/028137, filed on Jul. 20, 2020.

(51) Int. Cl.
*B60K 35/60* (2024.01)
*B60K 35/215* (2024.01)
*B60K 35/28* (2024.01)

(52) U.S. Cl.
CPC .......... *B60K 35/60* (2024.01); *B60K 35/215* (2024.01); *B60K 35/28* (2024.01); *B60K 2360/162* (2024.01); *B60K 2360/48* (2024.01); *B60Y 2400/304* (2013.01)

(58) Field of Classification Search
CPC ...... B60K 35/215; B60K 35/28; B60K 35/60; B60K 2360/48; B60K 2360/162; B60W 2540/12; B60Y 2400/304
See application file for complete search history.

(56) References Cited

U.S. PATENT DOCUMENTS

| 9,409,481 | B2 | 8/2016 | Choi |
| 2008/0258892 | A1 | 10/2008 | Itoh et al. |
| 2015/0109756 | A1* | 4/2015 | Choi ............ G01D 7/002 |
| | | | 362/23.01 |

FOREIGN PATENT DOCUMENTS

| JP | 2004-196276 A | 7/2004 |
| JP | 2005-067576 A | 3/2005 |
| JP | 2007-538227 A | 12/2007 |
| JP | 2012-158208 A | 8/2012 |
| JP | 2012-251449 A | 12/2012 |
| JP | 2020-012840 A | 1/2020 |
| JP | 2020-052932 A | 4/2020 |
| KR | 10-1491330 B1 | 2/2015 |

OTHER PUBLICATIONS

International Search Report and Written Opinion mailed on Oct. 6, 2020, received for PCT Application PCT/JP2020/028137, filed on Jul. 20, 2020, 8 pages including English Translation.

(Continued)

*Primary Examiner* — Kathleen V Nguyen

(74) *Attorney, Agent, or Firm* — XSENSUS LLP

(57) ABSTRACT

A display control device is configured to include a pedal operation detecting unit to detect a pedal operation of a vehicle, and a display mode switching unit to switch a display mode of a meter, out of meters displayed on an instrument panel of the vehicle, whose presentation information is related to the pedal operation depending on a detection result of the pedal operation by the pedal operation detecting unit.

3 Claims, 8 Drawing Sheets

(56) References Cited

OTHER PUBLICATIONS

Notice of Reasons for Refusal mailed on Mar. 23, 2021, received for JP Application 2020-568478, 4 pages including English Translation.
Notice of Reasons for Refusal mailed on Jul. 13, 2021, received for JP Application 2020-568478, 5 pages including English Translation.
Chinese Office Action issued Sep. 14, 2024 in corresponding Chinese Patent Application No. 202080102791.2, 13 pages.

* cited by examiner

DISPLAY CONTROL DEVICE AND DISPLAY CONTROL METHOD

CROSS-REFERENCE TO RELATED APPLICATION

The present application is a continuation of International Patent Application PCT/JP2020/028137, filed Jul. 20, 2020, the entire contents of which are incorporated herein by reference.

TECHNICAL FIELD

The present disclosure relates to a display control device and a display control method.

BACKGROUND ART

Patent Literature 1 below discloses a brake lamp display device that displays characters "brake" in a dedicated display region on an instrument panel of a vehicle when an operation of a brake pedal by a driver of the vehicle is detected.

CITATION LIST

Patent Literatures

Patent Literature 1: JP 2005-67576 A

SUMMARY OF INVENTION

Technical Problem

The brake lamp display device disclosed in Patent Literature 1 has a problem that the dedicated display region for displaying the characters "brake" needs to be provided on the instrument panel of the vehicle.

The present disclosure is achieved for solving the above-described problem, and an object thereof is to obtain a display control device and a display control method capable of notifying a driver of whether or not a pedal operation is performed by the driver of a vehicle without providing a dedicated display region on an instrument panel of the vehicle.

Solution to Problem

A display control device according to the present disclosure includes processing circuitry to perform detection of a pedal operation of a vehicle including a brake pedal operation and an accelerator pedal operation, and to switch a type of a figure representing a meter, out of meters displayed on an instrument panel of the vehicle, whose presentation information is related to the pedal operation depending on a result of the detection of the pedal operation indicating that whether the brake pedal operation is detected, the accelerator pedal operation is detected, or neither the brake pedal operation nor the accelerator pedal operation is detected.

Advantageous Effects of Invention

According to the present disclosure, it is possible to notify a driver of whether or not a pedal operation is performed by the driver of a vehicle without providing a dedicated display region on an instrument panel of the vehicle.

BRIEF DESCRIPTION OF DRAWINGS

FIG. 3 is a hardware configuration diagram of a computer in a case where the display control device 3 is implemented by software, firmware or the like.

DESCRIPTION OF EMBODIMENTS

Hereinafter, some embodiment for carrying out the present disclosure will be described with reference to the attached drawings in order to describe the present disclosure in further detail.

First Embodiment

Figure 1:
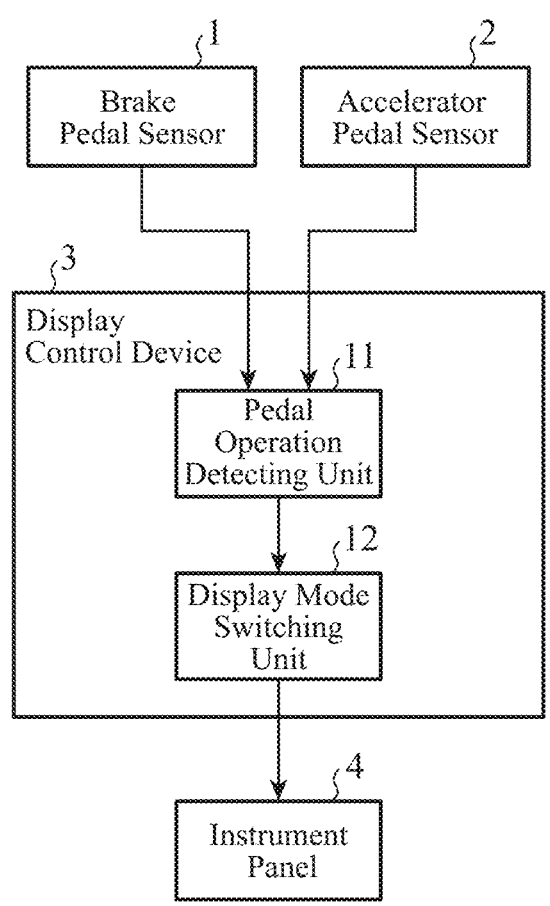
FIG. 1 is a configuration diagram illustrating a display control device 3 according to a first embodiment.

FIG. 1 is a configuration diagram illustrating a display control device 3 according to a first embodiment.

Figure 2:
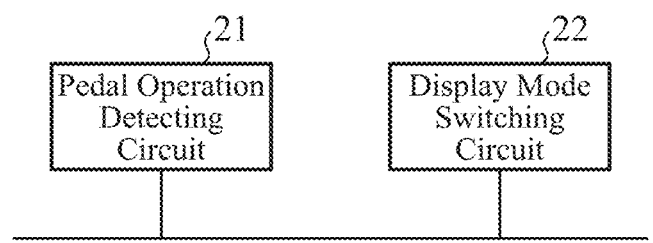
FIG. 2 is a hardware configuration diagram illustrating hardware of the display control device 3 according to the first embodiment.

FIG. 2 is a hardware configuration diagram illustrating hardware of the display control device 3 according to the first embodiment.

A brake pedal sensor 1 monitors an operation of a brake pedal of a vehicle, and outputs brake pedal operation information indicating whether or not a driver is performing a depression operation of the brake pedal to the display control device 3.

An accelerator pedal sensor 2 monitors an operation of an accelerator pedal of the vehicle, and outputs accelerator pedal operation information indicating whether or not the driver is performing a depression operation of the accelerator pedal to the display control device 3.

The display control device 3 makes an instrument panel 4 of the vehicle display a speed meter, a tachometer, a fuel gauge, a water thermometer, a distance meter or the like on an instrument panel 4.

The display control device 3 notifies the driver of whether or not a pedal operation is performed by the driver of the vehicle without providing a dedicated display region on the instrument panel 4 of the vehicle.

In a case where a display area of the instrument panel 4 is limited, when the dedicated display region for displaying characters "brake", for example, is provided on the instrument panel 4 of the vehicle, a region for displaying other information becomes relatively narrow, and the driver might have difficulty in checking other information. Since the display control device 3 does not need to provide the dedicated display region on the instrument panel 4 of the vehicle, the region for displaying other information does not become relatively narrow.

The instrument panel 4 is a dashboard provided in front of a driver's seat of the vehicle, on which the speed meter, the tachometer, the fuel gauge, the water thermometer, the distance meter or the like are displayed.

In the display control device 3 illustrated in FIG. 1, the instrument panel 4 is supposed to be a so-called digital meter, but this may be an analog meter.

The display control device 3 illustrated in FIG. 1 is provided with a pedal operation detecting unit 11 and a display mode switching unit 12.

The pedal operation detecting unit 11 is implemented by a pedal operation detecting circuit 21 illustrated in FIG. 2, for example.

The pedal operation detecting unit 11 acquires the brake pedal operation information from the brake pedal sensor 1 and acquires the accelerator pedal operation information from the accelerator pedal sensor 2.

The pedal operation detecting unit 11 detects the pedal operation of the vehicle.

That is, the pedal operation detecting unit 11 detects the operation of the brake pedal when the brake pedal operation information indicates that the driver is performing the depression operation of the brake pedal.

The pedal operation detecting unit 11 detects the operation of the accelerator pedal when the accelerator pedal operation information indicates that the driver is performing the depression operation of the accelerator pedal.

The pedal operation detecting unit 11 outputs a detection result of the pedal operation to the display mode switching unit 12.

The display mode switching unit 12 is implemented by a display mode switching circuit 22 illustrated in FIG. 2, for example.

The display mode switching unit 12 makes the instrument panel 4 display the speed meter, the tachometer, the fuel gauge, the water thermometer, the distance meter or the like.

The display mode switching unit 12 switches a display mode of a meter whose presentation information is related to the pedal operation out of the meters displayed on the instrument panel 4 depending on the detection result of the pedal operation by the pedal operation detecting unit 11.

The speed meter or the tachometer is conceivable as the meter whose presentation information is related to the pedal operation.

Therefore, the display mode switching unit 12 switches the display mode of the speed meter or the display mode of the tachometer depending on the detection result of the pedal operation by the pedal operation detecting unit 11.

In FIG. 1, it is assumed that each of the pedal operation detecting unit 11 and the display mode switching unit 12, which are components of the display control device 3, is implemented by dedicated hardware as illustrated in FIG. 2. That is, it is assumed that the display control device 3 is implemented by the pedal operation detecting circuit 21 and the display mode switching circuit 22.

Each of the pedal operation detecting circuit 21 and the display mode switching circuit 22 corresponds to, for example, a single circuit, a composite circuit, a programmed processor, a parallel-programmed processor, an application specific integrated circuit (ASIC), a field-programmable gate array (FPGA), or a combination thereof.

The components of the display control device 3 are not limited to those implemented by dedicated hardware, and the display control device 3 may also be implemented by software, firmware, or a combination of software and firmware.

The software or firmware is stored as a program in a memory of a computer. The computer means hardware that executes programs, and corresponds to, for example, a central processing unit (CPU), a central processor, a processing unit, an arithmetic unit, a microprocessor, a microcomputer, a processor, a digital signal processor (DSP) or the like.

Figure 3:
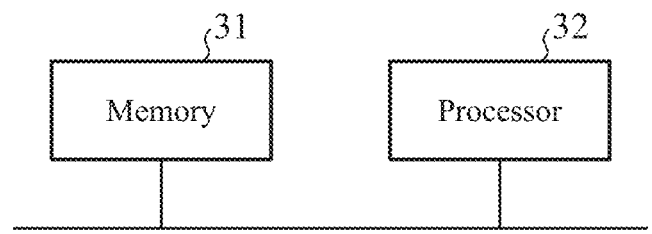

FIG. 3 is a hardware configuration diagram of the computer in a case where the display control device 3 is implemented by software, firmware or the like.

In a case where the display control device 3 is implemented by software, firmware or the like, a program for causing the computer to execute each procedure performed by the pedal operation detecting unit 11 and the display mode switching unit 12 is stored in a memory 31. A processor 32 of the computer executes the program stored in the memory 31.

FIG. 2 illustrates an example in which each of the components of the display control device 3 is implemented by dedicated hardware, and FIG. 3 illustrates an example in which the display control device 3 is implemented by software, firmware or the like. However, this is merely an example, and some components in the display control device 3 may be implemented by dedicated hardware, and the remaining components may be implemented by software, firmware or the like.

Next, an operation of the display control device 3 illustrated in FIG. 1 is described.

Figure 4:
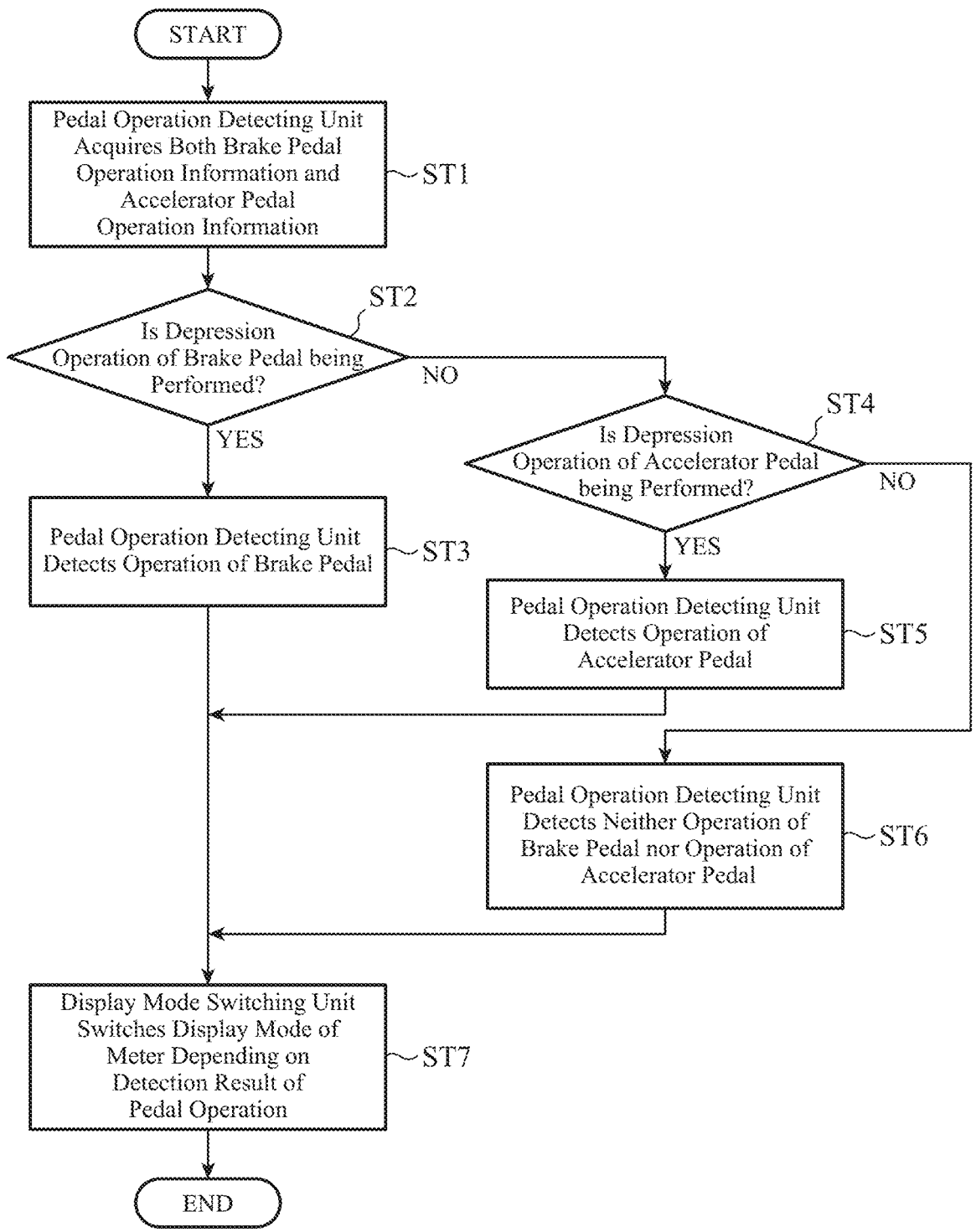
FIG. 4 is a flowchart illustrating a display control method being a procedure performed by the display control device 3 according to the first embodiment.

FIG. 4 is a flowchart illustrating a display control method being a procedure performed by the display control device 3 according to the first embodiment.

The brake pedal sensor 1 monitors the operation of the brake pedal of the vehicle.

The brake pedal sensor 1 outputs the brake pedal operation information indicating that the depression operation is being performed to the pedal operation detecting unit 11 of the display control device 3 when the driver is performing the depression operation of the brake pedal.

The brake pedal sensor 1 outputs the brake pedal operation information indicating that the depression operation is not being performed to the pedal operation detecting unit 11 when the driver is not performing the depression operation of the brake pedal.

The accelerator pedal sensor 2 monitors the operation of the accelerator pedal of the vehicle.

The accelerator pedal sensor 2 outputs the accelerator pedal operation information indicating that the depression operation is being performed to the pedal operation detecting unit 11 when the driver is performing the depression operation of the accelerator pedal.

The accelerator pedal sensor 2 outputs the accelerator pedal operation information indicating that the depression operation is not being performed to the pedal operation detecting unit 11 when the driver is not performing the depression operation of the accelerator pedal.

The pedal operation detecting unit 11 acquires the brake pedal operation information from the brake pedal sensor 1 and acquires the accelerator pedal operation information from the accelerator pedal sensor 2 (step ST1 in FIG. 4).

The pedal operation detecting unit 11 detects the operation of the brake pedal when the brake pedal operation information indicates that the driver is performing the depression operation of the brake pedal (YES at step ST2 in FIG. 4) (step ST3 in FIG. 4).

The pedal operation detecting unit 11 does not detect the operation of the brake pedal when the brake pedal operation information indicates that the driver is not performing the depression operation of the brake pedal (NO at step ST2 in FIG. 4).

The pedal operation detecting unit 11 detects the operation of the accelerator pedal when the accelerator pedal operation information indicates that the driver is performing the depression operation of the accelerator pedal (YES at step ST4 in FIG. 4) under the condition that the operation of the brake pedal is not detected (step ST5 in FIG. 4).

The pedal operation detecting unit 11 does not detect the operation of the accelerator pedal when it is indicated that the driver is not performing the depression operation of the accelerator pedal (NO at step ST4 in FIG. 4). That is, the pedal operation detecting unit 11 detects neither the operation of the brake pedal nor the operation of the accelerator pedal (step ST6 in FIG. 4).

The pedal operation detecting unit 11 outputs a detection result of the pedal operation to the display mode switching unit 12.

In the display control device 3 illustrated in FIG. 1, supposing that the depression operation of the brake pedal and the depression operation of the accelerator pedal are not simultaneously performed, when the pedal operation detecting unit 11 does not detect the operation of the brake pedal, if the accelerator pedal operation information indicates that the driver is performing the depression operation of the accelerator pedal, the operation of the accelerator pedal is detected. However, this is merely an example, and the pedal operation detecting unit 11 may detect the operation of the accelerator pedal, even under the condition that the operation of the brake pedal is detected, when the accelerator pedal operation information indicates that the driver is performing the depression operation of the accelerator pedal.

The display mode switching unit 12 makes the instrument panel 4 display the speed meter, the tachometer, the fuel gauge, the water thermometer, the distance meter or the like.

The display mode switching unit 12 switches the display mode of the meter whose presentation information is related to the pedal operation out of the meters displayed on the instrument panel 4 depending on the detection result of the pedal operation by the pedal operation detecting unit 11 (step ST7 in FIG. 4).

Hereinafter, switch processing of the display mode performed by the display mode switching unit 12 is specifically described.

The display mode switching unit 12 acquires the detection result of the pedal operation from the pedal operation detecting unit 11.

Figure 5:
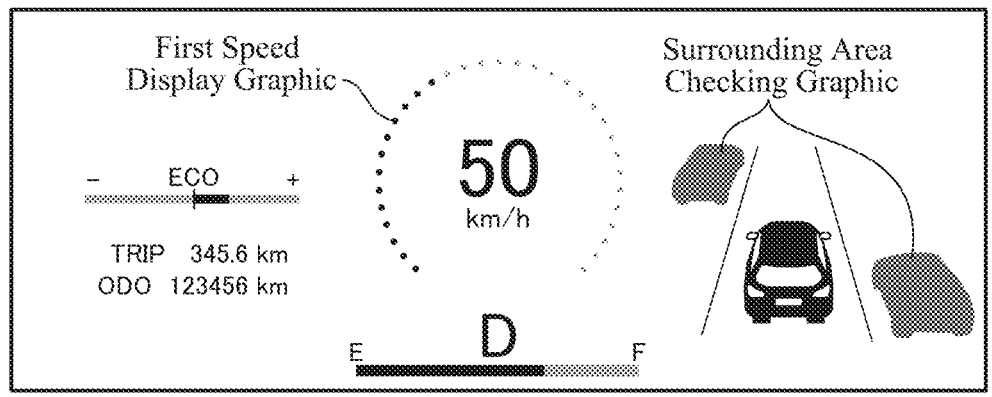
FIG. 5 is an explanatory diagram illustrating a display mode of a speed meter when an operation of a brake pedal is detected.

When the detection result of the pedal operation indicates that the operation of the brake pedal is detected, the display mode switching unit 12 makes the instrument panel 4 display the speed meter as illustrated in FIG. 5.

FIG. 5 is an explanatory diagram illustrating the display mode of the speed meter when the operation of the brake pedal is detected.

On the instrument panel 4 illustrated in FIG. 5, an eco-meter (represented as "ECO" in the drawing) indicating a degree of achievement of energy saving, a character "D" indicating that the gear position is the drive position D, "50 km/h" indicating the speed of the vehicle, "123456 km" indicating the total travel distance of the vehicle (hereinafter referred to as "ODO"), and "345.6 km" indicating a sectional travel distance of the vehicle (hereinafter referred to as "TRIP") are displayed. Needless to say, each of "50 km/h", "123456 km", and "345.6 km/" is merely an example.

On the instrument panel 4 illustrated in FIG. 5, a surrounding area checking graphic indicating objects and the like present around the vehicle is displayed around the vehicle graphic.

A plurality of dot figures displayed in an arc shape around "50 km/h" is a first speed display graphic indicating that the speed of the vehicle is "50 km/h".

The first speed display graphic, which is a set of the plurality of dot figures, indicates that the driver is performing the operation of the brake pedal. In other words, when the driver is performing the operation of the brake pedal, the display mode switching unit 12 makes the instrument panel 4 display the first speed display graphic.

Figure 6:
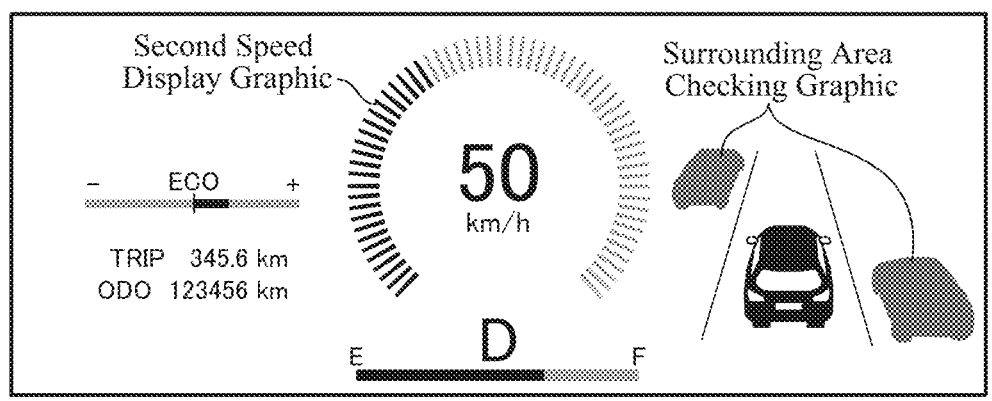
FIG. 6 is an explanatory diagram illustrating the display mode of the speed meter when an operation of an accelerator pedal is detected.

When the detection result of the pedal operation indicates that the operation of the accelerator pedal is detected, the display mode switching unit 12 makes the instrument panel 4 display the speed meter as illustrated in FIG. 6.

FIG. 6 is an explanatory diagram illustrating the display mode of the speed meter when the operation of the accelerator pedal is detected.

On the instrument panel 4 illustrated in FIG. 6, the eco-meter, the character "D" indicating that the gear position is the drive position D, "50 km/h" indicating the speed of the vehicle, "123456 km" indicating ODO, and "345.6 km" indicating TRIP are displayed.

On the instrument panel 4 illustrated in FIG. 6, the surrounding area checking graphic is displayed around the vehicle graphic.

A plurality of rod-shaped figures displayed in an arc shape around "50 km/h" is a second speed display graphic indicating that the speed of the vehicle is "50 km/h".

The second speed display graphic, which is a set of the plurality of rod-shaped figures, indicates that the driver is performing the operation of the accelerator pedal. In other words, when the driver is performing the operation of the accelerator pedal, the display mode switching unit 12 makes the instrument panel 4 display the second speed display graphic.

Figure 7:
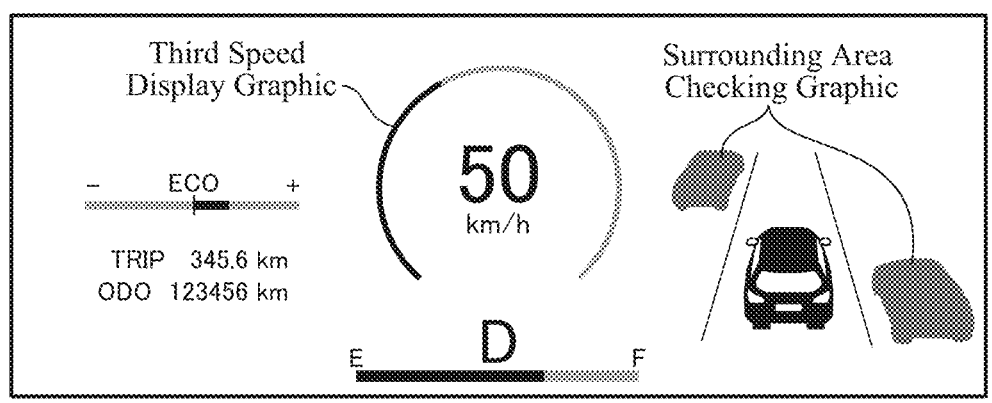
FIG. 7 is an explanatory diagram illustrating the display mode of the speed meter when neither the operation of the brake pedal nor the operation of the accelerator pedal is detected.

When the detection result of the pedal operation indicates that neither the operation of the brake pedal nor the operation of the accelerator pedal is detected, the display mode switching unit 12 makes the instrument panel 4 display the speed meter as illustrated in FIG. 7.

FIG. 7 is an explanatory diagram illustrating the display mode of the speed meter when neither the operation of the brake pedal nor the operation of the accelerator pedal is detected.

On the instrument panel 4 illustrated in FIG. 7, the eco-meter, the character "D" indicating that the gear position is the drive position D, "50 km/h" indicating the speed of the vehicle, "123456 km" indicating ODO, and "345.6 km" indicating TRIP are displayed.

On the instrument panel 4 illustrated in FIG. 7, the surrounding area checking graphic is displayed around the vehicle graphic.

A curved line figure displayed in an arc shape around "50 km/h" is a third speed display graphic indicating that the speed of the vehicle is "50 km/h".

The third speed display graphic, which is the curved line figure, indicates that the driver is performing neither the operation of the brake pedal nor the operation of the accelerator pedal. In other words, when the driver is performing neither the operation of the brake pedal nor the operation of the accelerator pedal, the display mode switching unit 12 makes the instrument panel 4 display the third speed display graphic.

In the display control device 3 illustrated in FIG. 1, the display mode switching unit 12 switches the shape of the speed display graphic depending on the detection result of the pedal operation by the pedal operation detecting unit 11. However, this is merely an example, and the display mode switching unit 12 may switch a color of the speed display graphic or may switch a color of "50 km/h" indicating the speed of the vehicle, for example, depending on the detection result of the pedal operation by the pedal operation detecting unit 11.

In the display control device 3 illustrated in FIG. 1, the display mode switching unit 12 switches the display mode of the speed meter depending on the detection result of the pedal operation by the pedal operation detecting unit 11. However, this is merely an example, and the display mode switching unit 12 may switch the display mode of the tachometer depending on the detection result of the pedal operation by the pedal operation detecting unit 11.

Figure 8:
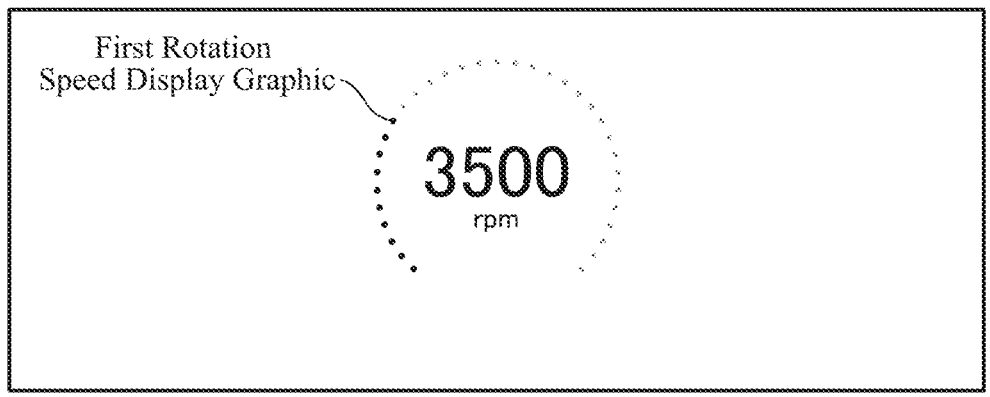
FIG. 8 is an explanatory diagram illustrating a display mode of a tachometer when the operation of the brake pedal is detected.

FIG. 8 is an explanatory diagram illustrating the display mode of the tachometer when the operation of the brake pedal is detected.

On the instrument panel 4 illustrated in FIG. 8, "3500 rpm" indicating an engine rotation speed is displayed. Needless to say, "3500 rpm" is merely an example.

A plurality of dot figures displayed in an arc shape around "3500 rpm" is a first rotation speed display graphic indicating that the engine rotation speed is "3500 rpm".

The first rotation speed display graphic, which is a set of the plurality of dot figures, indicates that the driver is performing the operation of the brake pedal. In other words, when the driver is performing the operation of the brake pedal, the display mode switching unit 12 makes the instrument panel 4 display the first rotation speed display graphic.

Figure 9:
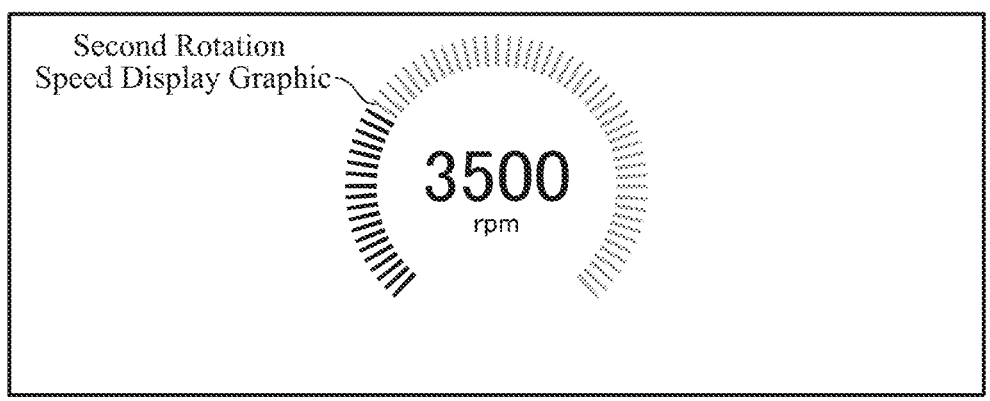
FIG. 9 is an explanatory diagram illustrating the display mode of the tachometer when the operation of the accelerator pedal is detected.

FIG. 9 is an explanatory diagram illustrating the display mode of the tachometer when the operation of the accelerator pedal is detected.

On the instrument panel 4 illustrated in FIG. 9, "3500 rpm" indicating the engine rotation speed is displayed.

A plurality of rod-shaped figures displayed in an arc shape around "3500 rpm" is a second rotation speed display graphic indicating that the engine rotation speed is "3500 rpm".

The second rotation speed display graphic, which is a set of the plurality of rod-shaped figures, indicates that the driver is performing the operation of the accelerator pedal. In other words, when the driver is performing the operation of the accelerator pedal, the display mode switching unit 12 makes the instrument panel 4 display the second rotation speed display graphic.

Figure 10:
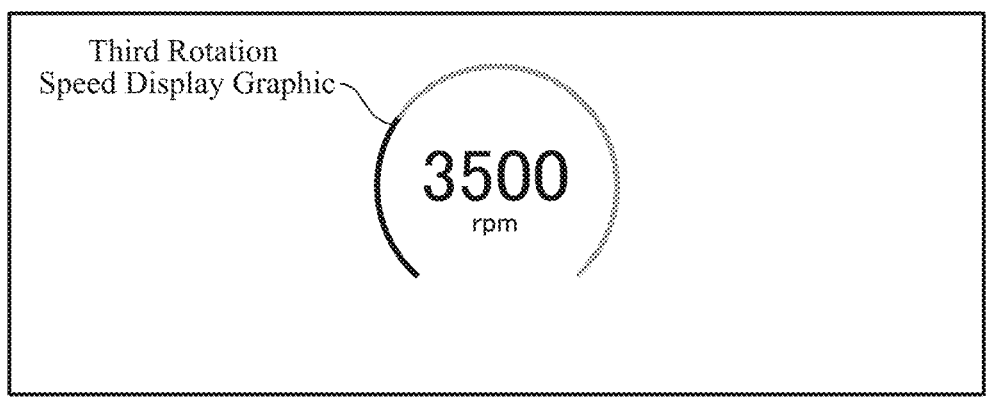
FIG. 10 is an explanatory diagram illustrating the display mode of the tachometer when neither the operation of the brake pedal nor the operation of the accelerator pedal is detected.

FIG. 10 is an explanatory diagram illustrating the display mode of the tachometer when neither the operation of the brake pedal nor the operation of the accelerator pedal is detected.

On the instrument panel 4 illustrated in FIG. 10, "3500 rpm" indicating the engine rotation speed is displayed.

A curved line figure displayed in an arc shape around "3500 rpm" is a third rotation speed display graphic indicating that the engine rotation speed is "3500 rpm".

The third rotation speed display graphic, which is the curved line figure, indicates that the driver is performing neither the operation of the brake pedal nor the operation of the accelerator pedal. In other words, when the driver perform is performing neither the operation of the brake pedal nor the operation of the accelerator pedal, the display mode switching unit 12 makes the instrument panel 4 display the third rotation speed display graphic.

In the first embodiment described above, the display control device 3 is configured to be provided with the pedal operation detecting unit 11 that detects the pedal operation of the vehicle, and the display mode switching unit 12 that switches the display mode of the meter whose presentation information is related to the pedal operation out of the meters displayed on the instrument panel 4 of the vehicle depending on the detection result of the pedal operation by the pedal operation detecting unit 11. Therefore, the display control device 3 can notify the driver of whether or not the pedal operation is performed by the driver of the vehicle without providing the dedicated display region on the instrument panel 4 of the vehicle.

Second Embodiment

In a second embodiment, a display control device 3 is described that displays, when the detection result of a pedal operation by a pedal operation detecting unit 11 changes, animation indicating a transition between display modes at the time when a display mode switching unit 13 switches from a display mode before a detection result changes to a display mode after the detection result changes.

Figure 11:
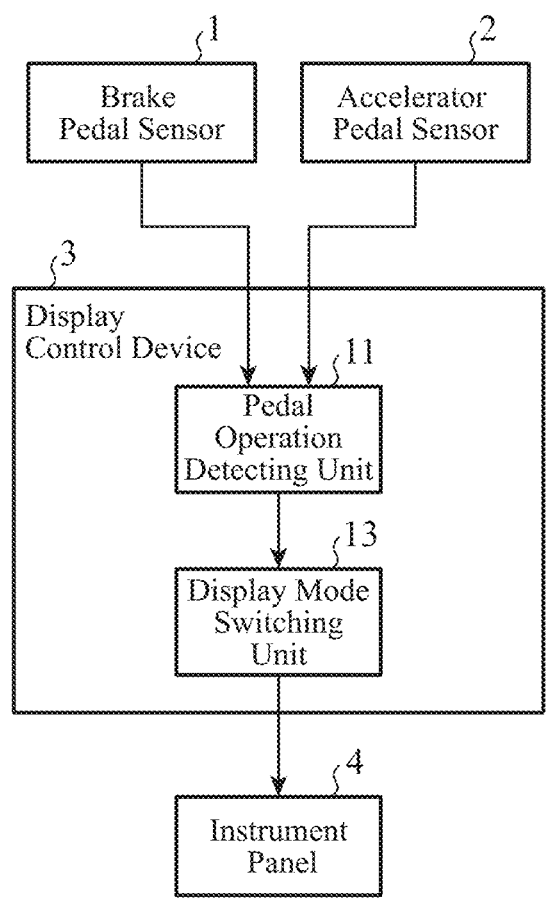
FIG. 11 is a configuration diagram illustrating a display control device 3 according to a second embodiment.

FIG. 11 is a configuration diagram illustrating the display control device 3 according to the second embodiment. In FIG. 11, the same reference signs as those in FIG. 1 represent the same or corresponding portions, so that the description thereof are omitted.

Figure 12:
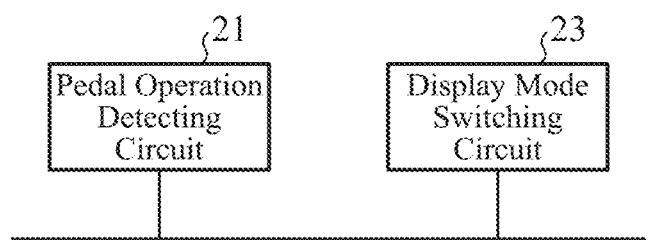
FIG. 12 is a hardware configuration diagram illustrating hardware of the display control device 3 according to the second embodiment.

FIG. 12 is a hardware configuration diagram illustrating hardware of the display control device 3 according to the second embodiment. In FIG. 12, the same reference signs as those in FIG. 2 represent the same or corresponding portions, so that the description thereof are omitted.

The display mode switching unit 13 is implemented by a display mode switching circuit 23 illustrated in FIG. 12, for example.

The display mode switching unit 13 makes an instrument panel 4 display a speed meter, a tachometer, a fuel gauge, a water thermometer, a distance meter or the like as is the case with the display mode switching unit 12 illustrated in FIG. 1.

The display mode switching unit 13 switches a display mode of a meter whose presentation information is related to a pedal operation out of the meters displayed on the instrument panel 4 depending on the detection result of the pedal operation by the pedal operation detecting unit 11 as is the case with the display mode switching unit 12 illustrated in FIG. 1.

The display mode switching unit 13 displays, unlike the display mode switching unit 12 illustrated in FIG. 1, animation indicating a transition between display modes at the time of switching from the display mode before the detection result changes to the display mode after the detection result changes when the detection result of the pedal operation by the pedal operation detecting unit 11 changes.

In FIG. 11, it is assumed that each of the pedal operation detecting unit 11 and the display mode switching unit 13, which are components of the display control device 3, is implemented by dedicated hardware as illustrated in FIG. 12. That is, it is assumed that the display control device 3 is implemented by a pedal operation detecting circuit 21 and the display mode switching circuit 23.

Each of the pedal operation detecting circuit 21 and the display mode switching circuit 23 corresponds to, for example, a single circuit, a composite circuit, a programmed processor, a parallel-programmed processor, an ASIC, a FPGA, or a combination thereof.

The components of the display control device 3 are not limited to those implemented by dedicated hardware, and the display control device 3 may also be implemented by software, firmware, or a combination of software and firmware.

In a case where the display control device 3 is implemented by software, firmware or the like, a program for causing a computer to execute each procedure performed by the pedal operation detecting unit 11 and the display mode switching unit 13 is stored in the memory 31 illustrated in FIG. 3. The processor 32 illustrated in FIG. 3 executes the program stored in the memory 31.

FIG. 12 illustrates an example in which each of the components of the display control device 3 is implemented by dedicated hardware, and FIG. 3 illustrates an example in which the display control device 3 is implemented by software, firmware or the like. However, this is merely an example, and some components in the display control device 3 may be implemented by dedicated hardware, and the remaining components may be implemented by software, firmware or the like.

Next, an operation of the display control device 3 illustrated in FIG. 11 is described.

However, it is similar to the display control device 3 illustrated in FIG. 1 except for the display mode switching unit 13, so that an operation of the display mode switching unit 13 is herein mainly described.

The pedal operation detecting unit 11 repeatedly performs detection processing of the pedal operation of the vehicle, and repeatedly outputs the detection result of the pedal operation to the display mode switching unit 13.

The display mode switching unit 13 switches, each time the detection result of the pedal operation is received from the pedal operation detecting unit 11, the display mode of the meter whose presentation information is related to the pedal operation depending on the detection result of the pedal operation by the pedal operation detecting unit 11.

The display mode switching unit 13 displays, unlike the display mode switching unit 12 illustrated in FIG. 1, animation indicating a transition between the display modes at the time of switching from the display mode before the detection result changes to the display mode after the detection result changes when the detection result of the pedal operation by the pedal operation detecting unit 11 changes.

Hereinafter, switch processing of the display mode performed by the display mode switching unit 13 is specifically described.

The display mode switching unit 13 determines whether or not the detection result of the pedal operation changes by comparing the detection results of the pedal operation repeatedly output from the pedal operation detecting unit 11 with each other.

When the detection result of the pedal operation changes, the display mode switching unit 13 specifies a mode of the change in the detection result.

As the mode of the change in the detection result of the pedal operation, for example, the following modes (1) to (6) are conceivable.

(1) Change from brake pedal operation "present" to pedal operation "absent"
(2) Change from pedal operation "absent" to brake pedal operation "present"
(3) Change from accelerator pedal operation "present" to pedal operation "absent"
(4) Change from pedal operation "absent" to accelerator pedal operation "present"
(5) Change from brake pedal operation "present" to accelerator pedal operation "present"
(6) Change from accelerator pedal operation "present" to brake pedal operation "present"

Pedal operation "absent" means that neither the operation of the brake pedal nor the operation of the accelerator pedal is detected.

When the mode of the change in the detection result is specified, the display mode switching unit 13 displays animation indicating a transition between the display modes at the time of switching from the display mode before the detection result changes to the display mode after the detection result changes.

Figure 13A:
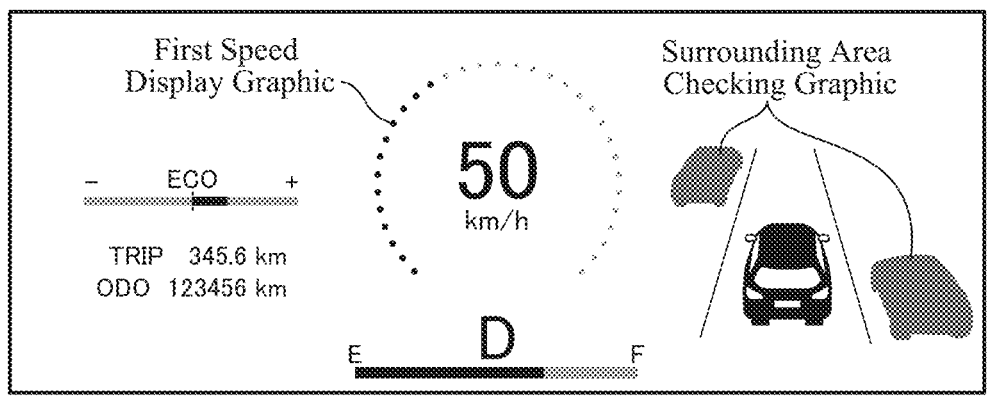
FIG. 13A is an explanatory diagram illustrating a display mode of a speed meter when an operation of a brake pedal is detected.
Figure 13B:
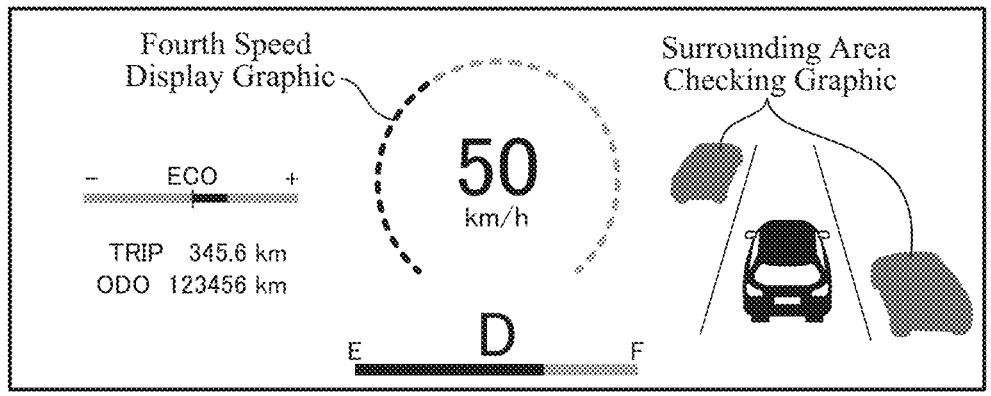
FIG. 13B is an explanatory diagram illustrating a state during switch of the display mode of the speed meter.
Figure 13C:
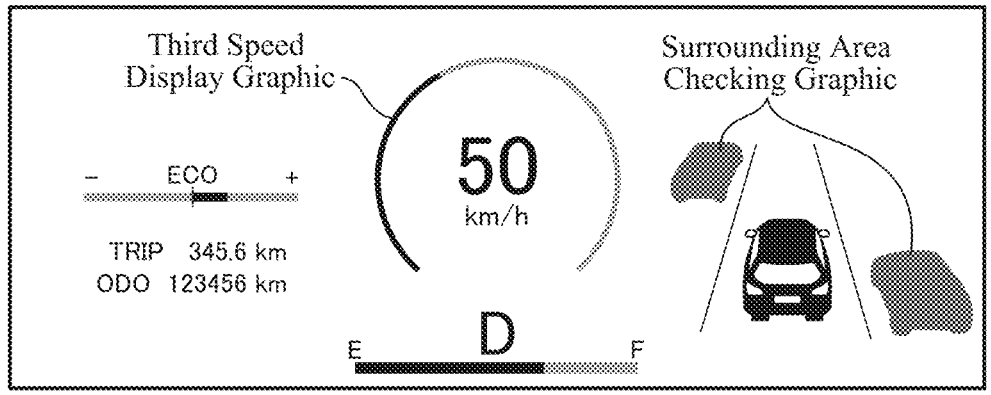
FIG. 13C is an explanatory diagram illustrating the display mode of the speed meter when neither the operation of the brake pedal nor an operation of an accelerator pedal is detected.

That is, when the mode of the change in the detection result is, for example, mode (1), the display mode switching unit 13 displays the animation indicating the transition between the display modes by displaying the display mode of the speed meter illustrated in FIG. 13B during the switch from the display mode of the speed meter illustrated in FIG. 13A to the display mode of the speed meter illustrated in FIG. 13C.

FIG. 13A is an explanatory diagram illustrating the display mode of the speed meter when the operation of the brake pedal is detected.

FIG. 13B is an explanatory diagram illustrating a state during the switch between the display modes of the speed meter.

FIG. 13C is an explanatory diagram illustrating the display mode of the speed meter when neither the operation of the brake pedal nor the operation of the accelerator pedal is detected.

A broken line figure displayed in an arc shape around "50 km/h" in the display mode of the speed meter illustrated in FIG. 13B is a fourth speed display graphic indicating that the speed of the vehicle is "50 km/h".

When a dot figure is extended in a circumferential direction, the broken line figure is obtained, and when the broken line figure is extended in the circumferential direction, a curved line figure is obtained. Therefore, an appearance of the fourth speed display graphic, which is a set of a plurality of broken line figures, is between an appearance of the first speed display graphic, which is a set of a plurality of dot figures, and an appearance of the third speed display graphic, which is a curved line figure. Therefore, by displaying each of the first speed display graphic, the fourth speed display graphic, and the third speed display graphic in this order by the display mode switching unit 13, the display form appears to be drawn in animation.

Figure 14A:
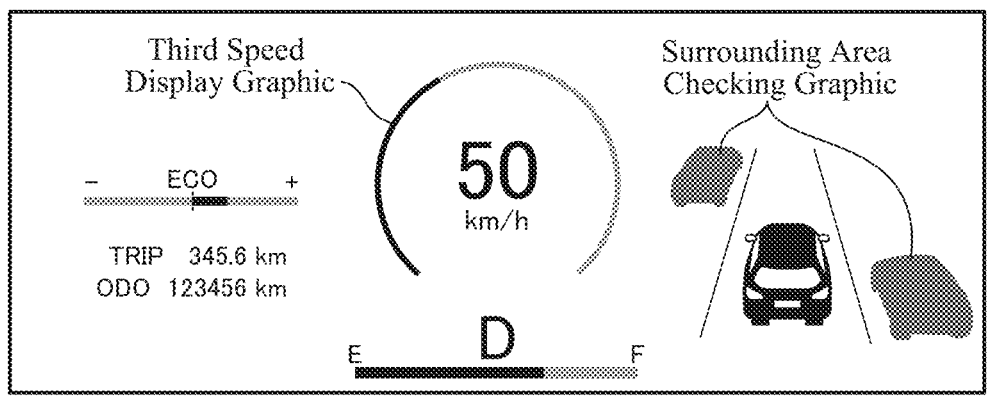
FIG. 14A is an explanatory diagram illustrating the display mode of the speed meter when neither the operation of the brake pedal nor the operation of the accelerator pedal is detected.
Figure 14B:
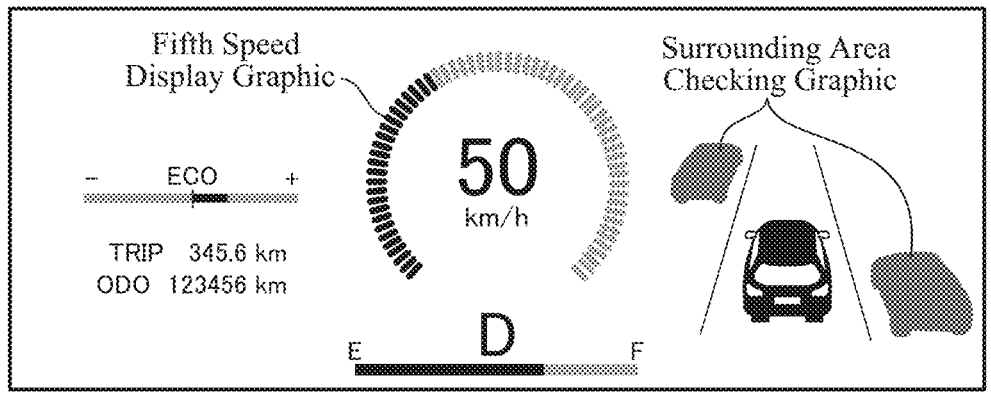
FIG. 14B is an explanatory diagram illustrating the state during the switch of the display mode of the speed meter.
Figure 14C:
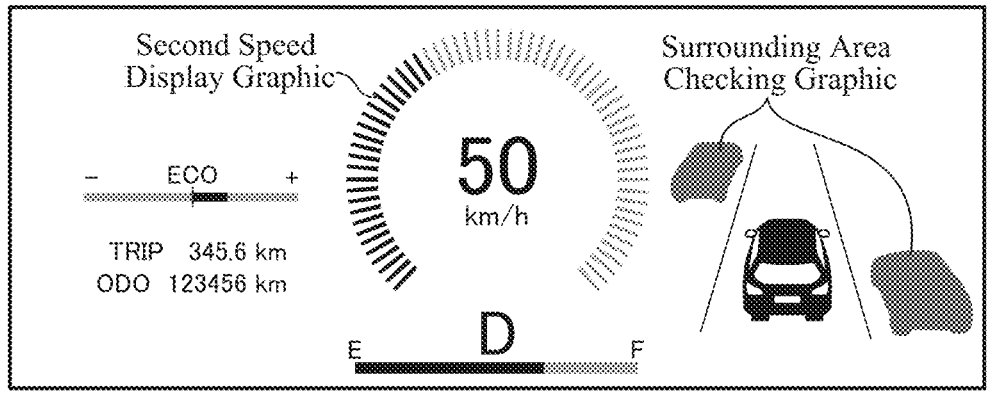
FIG. 14C is an explanatory diagram illustrating the display mode of the speed meter when the operation of the accelerator pedal is detected.

When the mode of the change in the detection result is, for example, mode (4), the display mode switching unit 13 displays the animation indicating the transition between the display modes by displaying the display mode of the speed meter illustrated in FIG. 14B during the switch from the display mode of the speed meter illustrated in FIG. 14A to the display mode of the speed meter illustrated in FIG. 14C.

FIG. 14A is an explanatory diagram illustrating the display mode of the speed meter when neither the operation of the brake pedal nor the operation of the accelerator pedal is detected.

FIG. 14B is an explanatory diagram illustrating a state during the switch between the display modes of the speed meter.

FIG. 14C is an explanatory diagram illustrating the display mode of the speed meter when the operation of the accelerator pedal is detected.

A plurality of rod-shaped figures displayed in an arc shape around "50 km/h" in the display mode of the speed meter illustrated in FIG. 14B is a fifth speed display graphic indicating that the speed of the vehicle is "50 km/h".

A line width of the plurality of rod-shaped figures included in the fifth speed display graphic is larger than a line width of a plurality of rod-shaped figures included in the second speed display graphic. Therefore, an appearance of the fifth speed display graphic, which is a set of the rod-shaped figures with the large line width, is between the appearance of the third speed display graphic, which is the curved line figure, and an appearance of the second speed display graphic, which is a set of the rod-shaped figures with a small line width. Therefore, by displaying each of the third speed display graphic, the fifth speed display graphic, and the second speed display graphic in this order by the display mode switching unit 13, the display mode appears to be drawn in animation.

In the second embodiment described above, the display control device 3 is configured so that the display mode switching unit 13 displays the animation indicating the transition between the display modes at the time when the display mode switching unit 13 switches from the display mode before the detection result changes to the display mode after the detection result changes when the detection result of the pedal operation by the pedal operation detecting unit 11 changes. Therefore, in addition to notifying the driver of whether or not the pedal operation is performed by the driver of the vehicle, the display control device 3 can notify the driver of the transition of the pedal operation without providing the dedicated display region on the instrument panel 4 of the vehicle.

Note that, in the present disclosure, the embodiments can be freely combined, any component of each embodiment can be modified, or any component can be omitted in each embodiment.

INDUSTRIAL APPLICABILITY

The present disclosure is suitable for the display control device and the display control method.

REFERENCE SIGNS LIST

1: brake pedal sensor, 2: accelerator pedal sensor, 3: display control device, 4: instrument panel, 11: pedal operation detecting unit, 12, 13: display mode switching unit, 21: pedal operation detecting circuit, 22, 23: display mode switching circuit, 31: memory, 32: processor

The invention claimed is:

1. A display control device comprising processing circuitry to perform detection of a pedal operation of a vehicle including a brake pedal operation and an accelerator pedal operation, and
to switch a type of a figure representing a meter, out of meters displayed on an instrument panel of the vehicle, whose presentation information is related to the pedal operation depending on a result of the detection of the pedal operation indicating that whether the brake pedal operation is detected, the accelerator pedal operation is detected, or neither the brake pedal operation nor the accelerator pedal operation is detected,
wherein the processing circuitry displays animation indicating transition in shape between types of the figure representing the meter when switching from the type of the figure having a first shape and representing the meter before the result of the detection changes to the type of the figure having a second shape which is different from the first shape and representing the meter after the result of the detection changes when the result of the detection of the pedal operation changes.

2. The display control device according to claim 1, wherein the meter whose-presentation information is related to the pedal operation is a speed meter or a tachometer.

3. A display control method comprising:
performing detection of a pedal operation of a vehicle including a brake pedal operation and an accelerator pedal operation;
switching the type of the figure representing the meter, out of meters displayed on an instrument panel of the vehicle, whose presentation information is related to the pedal operation depending on a result of the detection of the pedal operation indicating that whether the brake pedal operation is detected, the accelerator pedal operation is detected, or neither the brake pedal operation nor the accelerator pedal operation is detected; and
displaying animation indicating transition in shape between types of the figure representing the meter when switching from the type of the figure having a first shape and representing the meter before the result of the detection changes to the type of the figure having a second shape which is different from the first shape and representing the meter after the result of the detection changes when the result of the detection of the pedal operation changes.

* * * * *